May 27, 1952     L. J. PINDJAK     2,598,298
ANTISKID DEVICE FOR VEHICLE TIRES
Filed March 31, 1949     2 SHEETS—SHEET 1
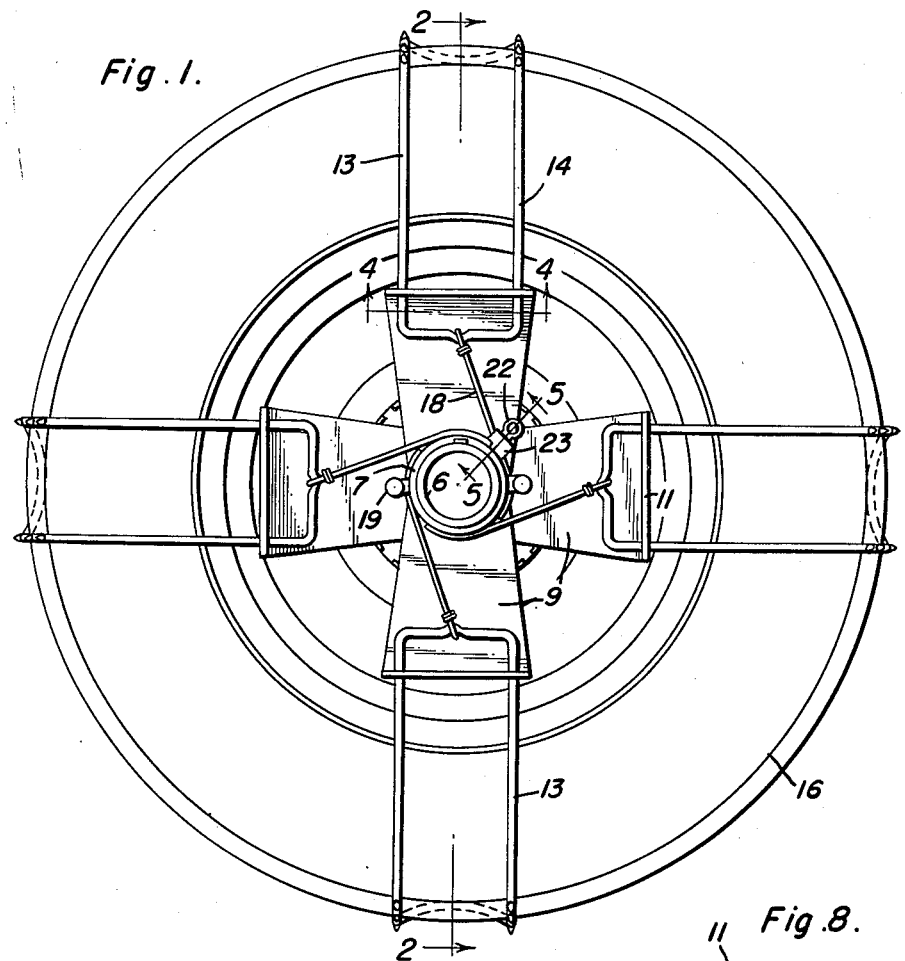
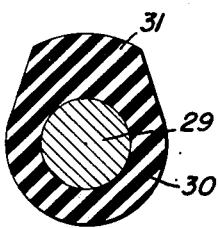
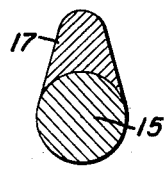
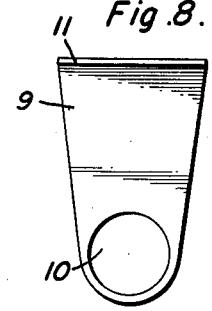
Inventor
Leo J. Pindjak
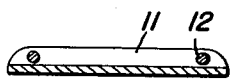
By *Clarence A. O'Brien and Harvey B. Jacobson*
                                  Attorneys May 27, 1952 — L. J. PINDJAK — 2,598,298
ANTISKID DEVICE FOR VEHICLE TIRES
Filed March 31, 1949 — 2 SHEETS—SHEET 2
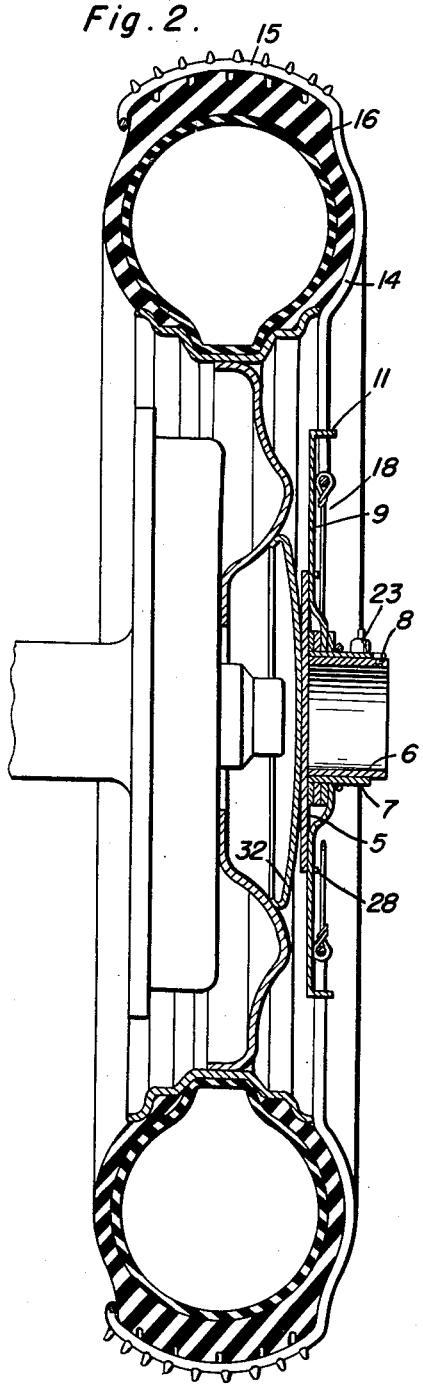
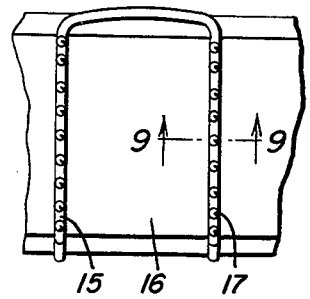
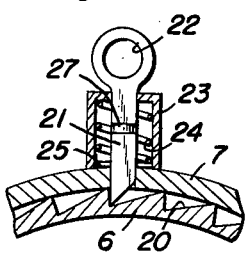
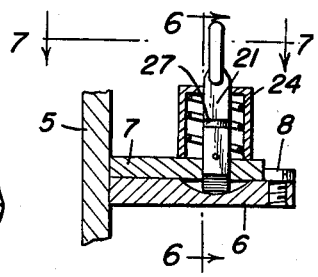
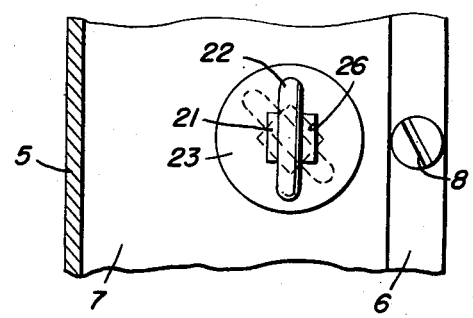
Inventor
Leo J. Pindjak Patented May 27, 1952

2,598,298

UNITED STATES PATENT OFFICE 2,598,298

ANTISKID DEVICE FOR VEHICLE TIRES

Leo J. Pindjak, Benton, Ill.

Application March 31, 1949, Serial No. 84,584

3 Claims. (Cl. 152—225)

The present invention relates to new and useful improvements in anti-skid devices for motor vehicles and more particularly to the provision of a plurality of cross members for mounting on the tire of a vehicle without necessitating jacking of the wheel or in reaching around the tire to place the device thereon.

An important object of the invention is to provide a connecting hub for the cross members with means carried by the hub for uniformly tightening the cross members on the tire.

Another object of the invention is to provide means for collapsing the anti-skid device on the hub for storing or carrying in a compact form.

A still further object of the invention is to provide a winch mechanism carried by the hub of the anti-skid device as the tightening means for the cross members.

Another object is to provide a device of this character of simple and practical construction, which is efficient and reliable in operation, strong and durable, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is an enlarged transverse sectional view taken on a line 2—2 of Figure 1;

Figure 3 is a plan view of the outer end of one of the cross members;

Figure 4 is a sectional view of one of the guides for the cross members taken on a line 4—4 of Figure 1;

Figure 5 is an enlarged fragmentary sectional view of the ratcheting locking means for the winch or drum taken on a line 5—5 of Figure 1;

Figure 6 is a sectional view taken on a line 6—6 of Figure 5;

Figure 7 is an enlarged sectional view taken on a line 7—7 of Figure 5;

Figure 8 is a view in elevation of one of the collapsible guides for the cross members;

Figure 9 is an enlarged sectional view of one of the cross members taken on a line 9—9 of Figure 3, and Figure 10 is a transverse sectional view of a modified cleat construction for the cross members.

Referring now to the drawings in detail, wherein for the purpose of illustration I have disclosed a preferred embodiment of the invention, the numeral 5 designates a disk on which a tubular hub 6 is suitably secured on one surface of the disk. A drum or winch 7 is rotatably mounted on hub 6 and is held thereon by means of a set screw 8 threaded into the hub outwardly at the outer end of the drum.

A plurality of arms 9 constructed of sheet metal are formed with an opening 10 at their inner ends for mounting on drum 7 and are formed with an outwardly projecting flange 11 at their outer ends and provided with openings 12 in which the parallel sides 13 of endless wire cross members 14 are slidably received.

The outer ends of the sides 13 of the cross members are curved inwardly to form hooks 15 to extend transversely of the tread 16 of a vehicle tire, the outer surface of the hooks 15 formed with cleats or traction lugs 17.

The outer ends of cables or other flexible members 18 are suitably connected to the inner ends of the wire cross members 14 and the inner ends of the cables 18 are suitably secured to the outer surface of drum or winch 7.

Handles 19 are provided at diametrically opposite sides of drum 7 to provide hand gripping means for rotating the drum.

The outer surface of hub 6 is formed with ratchet teeth 20 and a dog or pawl 21 is slidably mounted in drum 7 with its inner end in engagement with the teeth 20 and its outer end formed with a finger gripping ring 22. The dog or pawl 21 extends through the housing 23 suitably secured to the outer surface of drum 7 and in which a coil spring 24 is positioned to engage a washer or pin 25 secured to the dog or pawl to yieldably hold the latter inwardly in engagement with the ratchet teeth.

The dog 21 is square shape in cross section and slides in a square opening 26 in the outer end of housing 23. A circumferential groove 27 is formed in the dog which enables the dog to be held in an outward position against the tension of spring 24 by partially turning the dog after being pulled outwardly to cause the top of the housing to enter the groove, as indicated by dotted lines in Figure 7.

The outer surface of disk 5 is formed with pairs of lugs 28 between which the arms 9 are positioned to hold the arms from turning on drum 7.

In Figure 10 a modified cleat construction is illustrated and wherein the wire tire gripping hook 29 is embedded in a rubber covering 30 from which rubber cleats 31 project.

In the operation of the device, the drum 7 with arms 9 mounted thereon, is placed on hub 6 and secured in position by set screw 8. The arms 9 are held at angles of 90° with respect to each other by placing the arms between the pairs of lugs 28, the arms having the wire hooks 14 slidably mounted in the flanges 11 of the arms and connected to the drum by the cables 18.

The disk 5 is then placed against a wheel hub 32 and hooks 15 engaged over the tread of tire 16 and drum 7 is then rotated by handles 19 to tighten hooks 15, the drum being held from reverse movement by locking dog 21 engaging ratchet teeth 20 on the hub.

The hooks 15 may be released for removing the device from the tire by pulling dog 21 outwardly to release drum 7.

The arms may be collapsed by freeing the same from lugs 28 and swinging the arms on the drum, one against the other.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An anti-skid device comprising a plurality of tire gripping members positioned on the tread of a tire, a hub member, a tightening device rotatably mounted on the hub member in surrounding relation thereto, flexible members connecting the tire gripping members to the rotary tightening device to tighten the tire gripping members to the tire, and releasable means locking the tightening device to the hub member.

2. An anti-skid device comprising a plurality of tire tread engaging hooks having cleats on their outer ends, a hub member, individual guides for said hooks slidably supporting the hooks, a drum rotatably mounted on the hub and in said guides, and flexible members connecting the hooks to the drum for tightening the hooks on the tread.

3. An anti-skid device comprising a plurality of endless wire tire tread engaging hooks having parallel spaced apart sides, a hub member, a drum rotatably mounted on the hub, arms having inner ends in which said drum is rotatable and outer end flanges in which said sides of the hooks are slidably guided, flexible members connecting the hooks to the drum for tightening the hooks on the tread, and means locking the drum in its tightened position.

LEO J. PINDJAK.

REFERENCES CITED

The following references are of record in the file of this patent:

UNITED STATES PATENTS

| Number | Name | Date |
| --- | --- | --- |
| 1,237,274 | Bacon | Aug. 21, 1917 |
| 2,423,759 | Edwards | July 8, 1947 |
| 2,440,632 | Hack | Apr. 27, 1948 |
| 2,460,023 | McGuiness | Jan. 25, 1949 |
| 2,463,605 | Devine | Mar. 8, 1949 |
| 2,517,634 | Daley | Aug. 8, 1950 |
| 2,527,939 | Krider | Oct. 31, 1950 |